United States Patent
Pan et al.

(10) Patent No.: US 10,910,877 B2
(45) Date of Patent: Feb. 2, 2021

(54) COMBINED VOLTAGE AND FREQUENCY TUNING FOR EFFICIENCY OPTIMIZATION

(71) Applicant: Shenzhen Yichong Wireless Power Technology Co. Ltd., Guangdong (CN)

(72) Inventors: Siming Pan, San Jose, CA (US); Tun Li, San Jose, CA (US); Dawei He, Burlingame, CA (US); Yihong Dai, Campbell, CA (US); Jingdong Sun, Rolla, MO (US)

(73) Assignee: SHENZHEN YICHONG WIRELESS POWER TECHNOLOGY CO. LTD, Shenzhen (CN)

( * ) Notice: Subject to any disclaimer, the term of this patent is extended or adjusted under 35 U.S.C. 154(b) by 55 days.

(21) Appl. No.: 15/490,398

(22) Filed: Apr. 18, 2017

(65) Prior Publication Data
US 2018/0241248 A1    Aug. 23, 2018

Related U.S. Application Data

(60) Provisional application No. 62/460,617, filed on Feb. 17, 2017.

(51) Int. Cl.
*H02J 50/00* (2016.01)
*H02J 50/10* (2016.01)
(Continued)

(52) U.S. Cl.
CPC ............. *H02J 50/10* (2016.02); *H02J 50/80* (2016.02); *H02J 50/90* (2016.02); *H04B 5/00* (2013.01); *H04W 4/80* (2018.02)

(58) Field of Classification Search
CPC .................................. H02J 50/00; H04B 5/00
(Continued)

(56) References Cited

U.S. PATENT DOCUMENTS 9,466,987 B2 *  10/2016  Tamaki ................. H02J 7/0029
9,991,748 B2 *   6/2018  Yamamoto ............. H02J 50/20
(Continued)

FOREIGN PATENT DOCUMENTS

CN         102292896 A      12/2011
CN         102395983 A       3/2012
(Continued)

OTHER PUBLICATIONS

International Search Report and Written Opinion for International Application No. PCT/CN2018/077752, dated May 30, 2018, (11 pages).

*Primary Examiner* — Adi Amrany
(74) *Attorney, Agent, or Firm* — Sheppard Mullin Richter & Hampton LLP

(57) ABSTRACT

Methods and devices for increasing power delivery efficiency of wireless power transfer systems are disclosed. A wireless power transfer system may include a power transmitter system and a power receiver system. The power transmitter system may comprise a power amplifier, a power transmitter, a controller, and a sensing circuit. The power amplifier may be configured to receive an input power. The power transmitter system may include a transmitter-side coil configured to wirelessly couple to a receiver-side coil of the power receiver system. The controller may be configured to set a voltage and a frequency of the power transmitter system based on output power information of the power receiver system to increase wireless power delivery efficiency of the wireless power transfer system. The sensing circuit may be configured to determine the output power information of the power receiver system.

10 Claims, 5 Drawing Sheets

(51) Int. Cl.
*H02J 50/80* (2016.01)
*H02J 50/90* (2016.01)
*H04B 5/00* (2006.01)
*H04W 4/80* (2018.01)

(58) Field of Classification Search
USPC .......................................................... 307/104
See application file for complete search history.

(56) References Cited

U.S. PATENT DOCUMENTS

| | | | |
|---|---|---|---|
| 2010/0181961 A1 | 7/2010 | Novak et al. | |
| 2010/0244576 A1 | 9/2010 | Hillan et al. | |
| 2012/0104867 A1* | 5/2012 | Mudrick | H02J 7/025 |
| | | | 307/104 |
| 2013/0334892 A1* | 12/2013 | Hall | H01F 38/14 |
| | | | 307/104 |
| 2014/0167688 A1 | 6/2014 | Doyle et al. | |
| 2015/0061577 A1* | 3/2015 | Ye | H02J 7/025 |
| | | | 320/108 |
| 2015/0236526 A1* | 8/2015 | Jadidian | H02J 5/005 |
| | | | 320/108 |
| 2015/0270719 A1* | 9/2015 | Kurs | H02J 50/40 |
| | | | 320/108 |
| 2016/0064951 A1* | 3/2016 | Yamamoto | H02J 50/12 |
| | | | 307/104 |
| 2017/0229921 A1* | 8/2017 | Hwang | H03F 3/3015 |
| 2017/0338686 A1* | 11/2017 | Pan | H02J 50/10 |
| 2018/0159353 A1* | 6/2018 | Pan | H02J 7/025 |

FOREIGN PATENT DOCUMENTS

| | | |
|---|---|---|
| CN | 103812229 A | 5/2014 |
| CN | 104333148 A | 2/2015 |
| JP | 2016182035 A | 10/2016 |

* cited by examiner

COMBINED VOLTAGE AND FREQUENCY TUNING FOR EFFICIENCY OPTIMIZATION

CROSS-REFERENCE TO RELATED APPLICATIONS

This application claims the benefit of U.S. Provisional Application Ser. No. 62/460,617, filed Feb. 17, 2017, and entitled "COMBINED VOLTAGE AND FREQUENCY TUNING FOR EFFICIENCY OPTIMIZATION." The entirety of the aforementioned application is incorporated herein by reference.

TECHNICAL FIELD

The disclosure relates generally to wirelessly providing power to devices, and particularly to combined voltage and frequency tuning for power delivery efficiency optimization.

BACKGROUND

Wireless power transfer (WPT) technology provides the convenience of wirelessly transferring power to electronic devices (e.g., wirelessly charging electronic devices). In a WPT system, power/energy may be transferred from one or more power transmitter coils to one or more power receiver coils through magnetic coupling. Poor power delivery efficiency of a WPT system may result in energy loss and thermal problems, which poses potential threats to electronic components. Improving power delivery efficiency of WPT systems is desired.

SUMMARY

One aspect of the present disclosure is directed to a method for increasing power delivery efficiency of WPT systems. The method may comprise wirelessly coupling a transmitter-side coil of a power transmitter system to a receiver-side coil of a power receiver system; determining output power information of the power receiver system; and setting a voltage and a frequency of the power transmitter system based on the output power information of the power receiver system to increase wireless power delivery efficiency of the WPT system.

Another aspect of the present disclosure is directed to a wireless power transmitter system for wirelessly providing power to devices. The wireless power transmitter system may comprise a power amplifier, a power transmitter, a controller, and a sensing circuit. The power amplifier may be configured to receive an input power. The power transmitter may be coupled to the power amplifier. The power transmitter may include a transmitter-side coil configured to wirelessly couple to a receiver-side coil of a power receiver system. The controller may be coupled to the power amplifier. The controller may be configured to set a voltage and a frequency of the wireless power transmitter system based on output power information of the power receiver system to increase wireless power delivery efficiency of the WPT system. The sensing circuit may be coupled to the controller. The sensing circuit may be configured to determine the output power information of the power receiver system.

The controller may set the voltage and the frequency of the wireless power transmitter system based on a voltage-frequency tuning process. The voltage-frequency tuning process may include an outer voltage-tuning loop and an inner frequency-tuning loop. The voltage-frequency tuning process may include an inner voltage-tuning loop and an outer frequency-tuning loop. In some embodiments, the controller may be configured to save and reuse the set voltage and the set frequency for the power receiver system.

In some embodiments, the wireless power transmitter system may include a DC/DC converter between the power amplifier and the input power. The DC/DC converter may be coupled to the controller. The voltage of the wireless power transmitter system may include an input DC voltage of the power amplifier, and the controller may be configured to operate the DC/DC converter to provide the input DC voltage.

In some embodiments, the voltage of the wireless power transmitter system may include an output AC voltage of the power amplifier, and the controller may be configured to operate the power amplifier to provide the output AC voltage.

In some embodiments, the frequency of the wireless power transmitter system may include an output frequency of the power amplifier, and the controller may be configured to operate the power amplifier to provide the output frequency.

In some embodiments, the output power information of the power receiver system may include an amount of power received by a load of the power receiver system. In some embodiments, the output power information of the power receiver system may include amounts of a voltage and a current of the power receiver system.

In some embodiments, the output power information of the power receiver system may be determined based on load modulation. In some embodiments, the sensing circuit may include a load de-modulator. The load de-modulator may be configured to de-modulate signals modulated by a load modulator of the power receiver system. The signals may include the output power information of the power receiver system.

In some embodiments, the output power information of the power receiver system may be determined based on communication with the power receiver system. In some embodiments, the sensing circuit may include a first radio. The first radio may be configured to receive the output power information of the power receiver system from a second radio of the power receiver system.

It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings.

It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Figure 1:
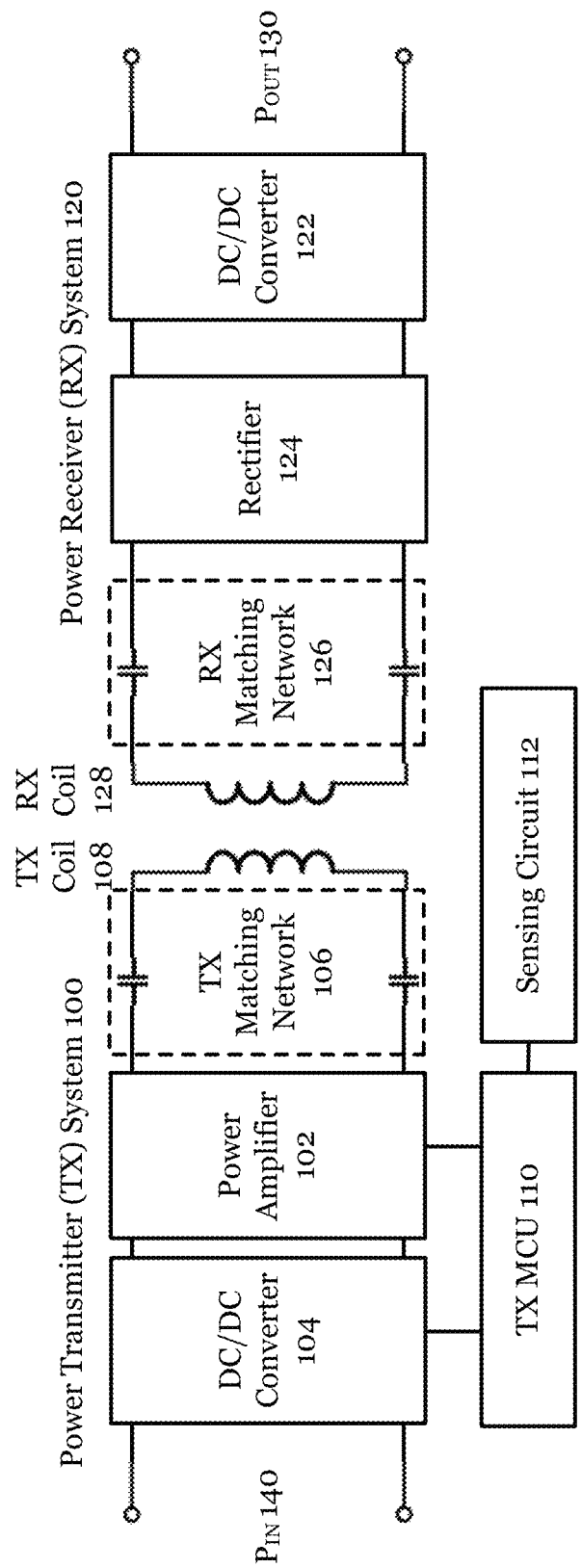
FIG. 1 illustrates an example diagram of a power transmitter system, in accordance with various embodiments of the disclosure.

FIG. 1 shows an example power transmitter system 100 according to some embodiments of the present disclosure. As shown in FIG. 1, the power transmitter (TX) system 100 includes a power amplifier 102, a DC/DC converter 104, a TX matching network 106 (including capacitors), a TX coil 108, a TX micro controller unit (TX MCU) 110, and a sensing circuit 112. One or more components of the power transmitter (TX) system 100 may be directly and/or indirectly coupled to other components of the power transmitter (TX) system 100. For example, the DC/DC converter 104 may be directly or indirectly coupled to the power amplifier 102 and/or the TX MCU 110. The power amplifier 102 may be directly or indirectly coupled to the TX matching network 106 and/or the TX MCU 110. The TX matching network 106 may be directly or indirectly coupled to the TX coil 108. The TX MCU 110 may be directly or indirectly coupled to the sensing circuit 112. The sensing circuit 112 may be directly and/or indirectly coupled to other parts of the power transmitter (TX) system 100.

The power amplifier 102 may be configured to receive an input power (e.g., through the DC/DC converter 104). In some embodiments, the power transmitter (TX) system 100 may be coupled to and/or may include a power source that provides input power ($P_{IN}$ 140). For example, the power transmitter (TX) system 100 may be coupled to an electrical output of another device and/or may include an internal power source (e.g., battery, solar panel) that provides input power ($P_{IN}$ 140). The DC/DC converter 104 may be configured to receive the input power ($P_{IN}$ 140) and deliver the input power (modified or unmodified) to the power amplifier 102. In some embodiments, the power transmitter (TX) system 100 may be implemented in a powering device (e.g., charger device). In some embodiments, the power transmitter (TX) system 100 may be coupled to a powering device (e.g., charger device).

A power transmitter may be coupled to the power amplifier 102 (e.g., through the TX matching network 106). The power transmitter may include one or more transmitter-side coils (TX coil 108) and/or other components. While FIG. 1 shows a single TX coil 108, this is merely illustrative and not meant to be limiting. The power transmitter (TX) system 100 may include a single transmitter-side coil or multiple transmitter-side coils.

The TX coil 108 may be configured to wirelessly couple to one or more receiver-side coils of one or more power receiver systems. A power receiver system may refer to a device that wirelessly receives power from a power transmitter through magnetic coupling between the transmitter-side coil(s) and the receiver-side coil(s). For example, FIG. 1 shows an example power receiver (RX) system 120. The power receiver (RX) system 120 may include a RX coil 128, a RX matching network 126, a rectifier 124, and a DC/DC converter 122. The outputs of the DC/DC converter 122 may be coupled to a load. The power receiver (RX) system 120 may be implemented in an electronic device, such as a cell phone, headset, watch, tablet device, laptop, electronic brush, car, or any other electronic devices that may wirelessly receive power. The power receiver (RX) system 120 may be implemented in a stand-alone charging device to which an electronic device may be attached to receive power.

The TX coil 108 of the power transmitter (TX) system 100 may wirelessly couple to the RX coil 128 of the power receiver (RX) system 120 when the RX coil 128 is near the TX coil 108. For example, the TX coil 108 may be included within a charging pad of a wireless charger and the RX coil 128 may be included within a cell phone. The TX coil 108 of the wireless charger may wirelessly couple to the RX coil 128 of the cell phone when the cell phone is brought near to the charging pad (e.g., placed near/on the charging pad). The interactions between the TX coil 108 and the RX coil 128 may be characterized by a coupling coefficient. A coupling coefficient may be a dimensionless value that characterizes interaction of two coils, and may be defined as the fraction of magnetic flux produced by the current in one coil that links with the other coil. The coupling coefficient of the TX coil 108 with the RX coil 128 may be denoted as k.

The sensing circuit 112 may be configured to determine output power information of the power receiver (RX) system 120. The sensing circuit 112 may provide the output power information of the power receiver (RX) system 120 to the TX MCU 110. The output power information of the power receiver (RX) system 120 may include an amount of power received by the load of the power receiver (RX) system 120 (e.g., $P_{OUT}$ 130). The output power information of the power receiver (RX) system 120 may include amounts of a voltage and a current of the power receiver (RX) system 120. For example, the output power information of the power receiver (RX) system 120 may include amounts of a voltage and a current delivered to a load of the power receiver (RX) system 120.

The sensing circuit 112 may be implemented as a communication device that communicates with the power receiver (RX) system 120 to receive the output power information of the power receiver (RX) system 120. The power receiver (RX) system 120 may include one or more sensors (e.g., voltage sensor, current sensor) to sense the output power information of the power receiver (RX) system 120. The sensed information may be transferred to the sensing circuit 112 via wireless communication (e.g., WiFi, Bluetooth), load modulation, and/or other methods of communication.

For example, the sensing circuit 112 may include one or more communication components (e.g., radio, RF core, antenna) to effectuate communication with the power receiver (RX) system 120. The power receiver (RX) system 120 may include a voltage sensor, a current sensor, and/or other sensors connected to various parts of the power receiver (RX) system 120 to monitor the voltage, current, and/or power of the power receiver (RX) system 120. The power receiver (RX) system 120 may include one or more communication components (e.g., radio, RF core, antenna) to effectuate communication with the power transmitter (TX) system 100. The voltage, current, and/or power of the power receiver (RX) system 120 monitored by the sensor(s) may be sent to the sensing circuit 112 via RX-to-TX communication. Other information may be sent by the power receiver (RX) system 120 to the power transmitter (TX) system 100.

As another example, the output power information of the power receiver (RX) system 120 may be determined/received by the power transmitter (TX) system 100 using load modulation. The power receiver (RX) system 120 may include a load modulator. The power receiver (RX) system 120 may use the load modulator to modulate signals including the output power information of the power receiver (RX) system 120. The sensing circuit 112 may include a load de-modulator. The load de-modulator may receive and demodulate the modulated signal including the output power information of the power receiver (RX) system 120. The modulated signals may include other information from the power receiver (RX) system 120.

The information received (e.g., output power information and/or other information) from the power receiver (RX) system 120 may be fed by the sensing circuit 112 to the TX MCU 110. The TX MCU 110 may generate one or more control signals based on the received information. The control signals may be sent to the power amplifier 102 and/or the DC/DC converter 104 to set the voltage and the frequency of the power transmitter (RX) system 100.

The TX MCU 110 may be configured to set a voltage and a frequency of the power transmitter (TX) system 100. The TX MCU 110 may set the voltage and the frequency of the power transmitter (TX) system 100 based on output power information of the power receiver (RX) system 120 (e.g., determined via/received from the sensing circuit 112). The TX MCU 110 may set the voltage and the frequency of the power transmitter (TX) system 100 to increase wireless power delivery efficiency of the WPT system (including power transmitter (TX) system 100 and power receiver (RX) system 120). The wireless power delivery efficiency of a WPT system may be defined as a ratio of RX output power (e.g., power consumed by a load connected to the power receiver (RX) system 120) over TX input power (e.g., input power to power transmitter (TX) system 100):

$$\eta = \frac{P_{out}}{P_{in}}$$

The TX MCU 110 may set the voltage and the frequency of the power transmitter (TX) system 100 to increase the ratio of RX output power over TX input power. The voltage of the power transmitter (TX) system 100 set by the TX MCU 110 may include the input DC voltage and/or the output AC voltage of the power amplifier 102. Based on the output power information of the power receiver (RX) system 120, the TX MCU 110 may use one or more control signals to operate the DC/DC converter 104 to set the input DC voltage of the power amplifier 102. Based on the output power information of the power receiver (RX) system 120, the TX MCU 110 may use one or more control signals to operate the power amplifier 102 to set the output AC voltage of the power amplifier 102.

The frequency of the power transmitter (TX) system 100 set by the TX MCU 110 may include an output frequency of the power amplifier 102. Based on the output power information of the power receiver (RX) system 120, the TX MCU 110 may operate the power amplifier 102 to set the output frequency of the power amplifier 102.

The TX MCU 110 may set the voltage and the frequency of the power transmitter (TX) system 100 based on one or more voltage-frequency tuning process. A voltage-frequency tuning process may include an outer voltage-tuning loop and an inner frequency-tuning loop. A voltage-frequency tuning process may include an inner voltage-tuning loop and an outer frequency-tuning loop. A voltage-tuning loop/frequency-tuning loop may refer to a repetition in the voltage-frequency tuning process that enables changing/sweeping the amount of voltage/frequency and determining the optimal/desired amount of voltage/frequency. An inner loop may be contained within an outer loop. A voltage-frequency tuning process may enable the TX MCU 110 to tune the parameters of the power transmitter (TX) system 100 to increase/optimize wireless power delivery efficiency.

The TX MCU 110 may calculate real-time wireless power delivery efficiency of the WPT system while sweeping the voltage and the frequency of the power transmitter (TX) system 100. Based on the observed wireless power delivery efficiency, the TX MCU 110 may set the voltage and the frequency of the power transmitter (TX) system 100 to maximize the wireless power delivery efficiency.

Figure 2:
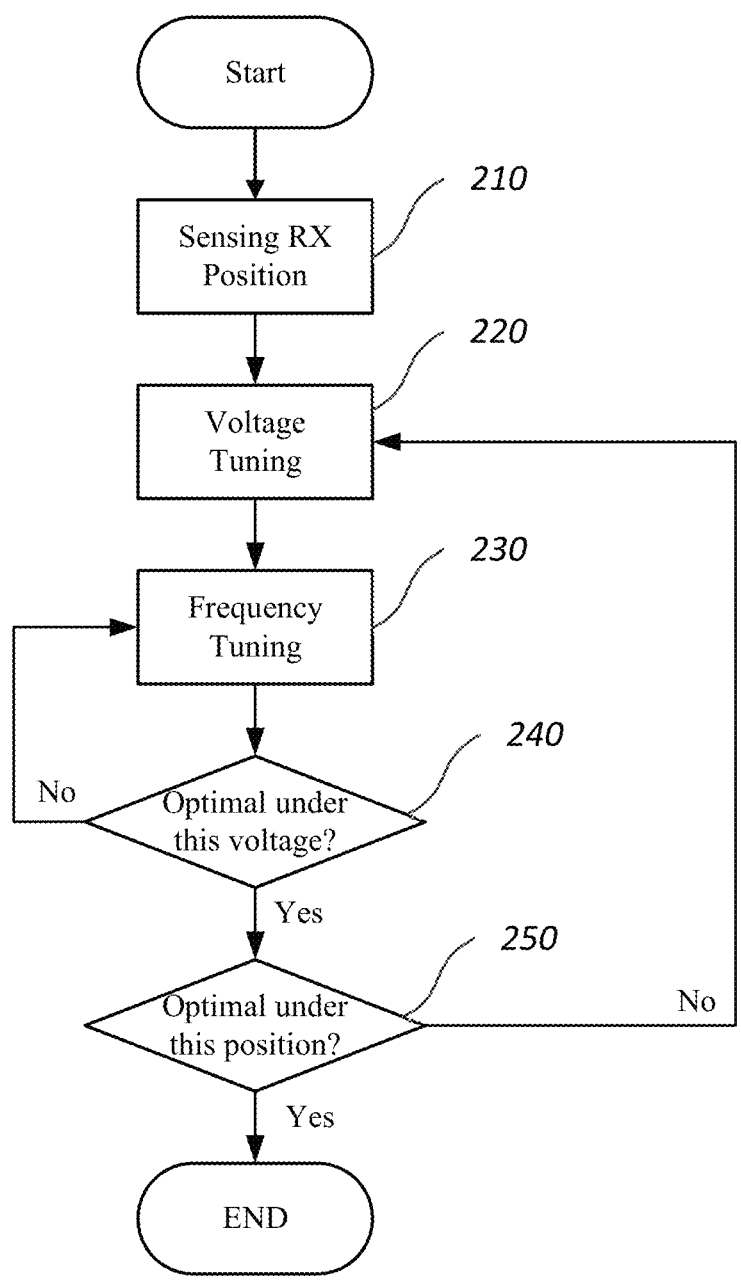
FIGS. 2-3 illustrate example flow diagrams for voltage tuning and frequency tuning, in accordance with various embodiments of the disclosure.

FIG. 2 illustrates an example flow diagram 200 for a voltage-frequency tuning process. To increase/optimize the wireless power delivery efficiency for different positions of the RX coil(s), the voltage and the frequency of a power transmitter system (e.g., the power transmitter (TX) system 100) may be tuned based on the output power information of a power receiver system (e.g., the power receiver (RX) system 120).

At step 210, the position of one or more RX coils may be sensed by the power transmitter (TX) system 100. The position of the RX coil(s) may be sensed using the value of the coupling coefficient between the TX coil(s) and the RX coil(s). The coupling coefficient between the TX coil(s) and the RX coil(s) may be larger when the TX coil(s) and the RX coil(s) are more aligned (e.g., maximized when completely aligned) and may be smaller when the TX coil(s) and the RX coil(s) are less aligned (e.g., minimized when not aligned).

At step 220, the TX MCU 110 may set the voltage of the power transmitter (TX) system 100. The TX MCU 110 may set the voltage by operating the DC/DC converter 104 and/or the power amplifier 102. The voltage may be set based on the sensed position of the RX coil(s). The TX MCU 110 may include or retrieve information (e.g., a database, lookup table) that matches a sensed position of the RX coil(s) with an amount of voltage.

At step 230, the TX MCU 110 may set the frequency of the power transmitter (TX) system 100. The TX MCU 110 may set the frequency by operating the power amplifier 102. The amount of the frequency may be set based on the set voltage, a default value, and/or other values.

At step 240, the TX MCU 110 may determine whether the frequency set at step 230 provides optimal/desired wireless power delivery efficiency for the voltage set at step 220. If not, the process returns to step 230, where the TX MCU 110 will change/sweep the frequency and return to step 240. The loop/repetition between steps 230 and 240 may form an inner frequency-tuning loop.

At step 250, the TX MCU 110 may determine whether the voltage set at step 220 provides optimal/desired wireless power delivery efficiency. If not, the process returns to step 220, where the TX MCU 110 will change/sweep the voltage and proceed to steps 230, 240, 250. The loop/repetition between steps 220 and 250 may form an outer voltage-tuning loop.

In some embodiments, the frequency-tuning loop and the voltage-tuning loop may be switched. For example, rather than determining optimal frequency for certain voltages (inner frequency-tuning loop) and then determining optimal voltage under a particular position (outer voltage-tuning loop), optimal voltage may be determined for certain frequencies (inner voltage-tuning loop) and then the optimal frequency may be determined (outer frequency-tuning loop).

Figure 3:
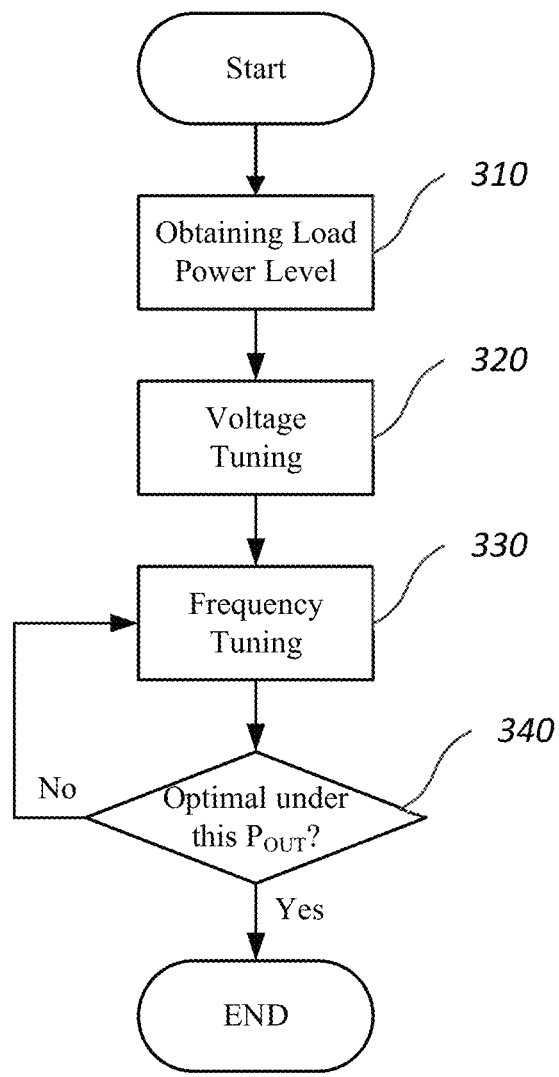

FIG. 3 illustrates an example flow diagram 300 for a voltage-frequency tuning process. To achieve interoperability of different load power levels (e.g., the power transmitter (TX) system 100 is charging devices of different power requirements), the voltage of the power transmitter (TX) system 100 may be set to a suitable value and the frequency may be tuned to increase/optimize wireless power delivery efficiency.

At step 310, the load power level of the power receiver (RX) system 120 may be obtained by the power transmitter (TX) system 100. The load power level of the power receiver (RX) system 120 may be obtained based on communication with the power receiver (RX) system 120.

At step 320, the TX MCU 110 may set the voltage of the power transmitter (TX) system 100. The TX MCU 110 may set the voltage by operating the DC/DC converter 104 and/or the power amplifier 102. The voltage may be set based on the load power level of the power receiver (RX) system 120. The TX MCU 110 may include or retrieve information (e.g., a database, lookup table) that matches a load power level of the power receiver (RX) system 120 with an amount of voltage.

At step 330, the TX MCU 110 may set the frequency of the power transmitter (TX) system 100. The TX MCU 110 may set the frequency by operating the power amplifier 102. The amount of the frequency may be set based on the set voltage, a default value, and/or other values.

At step 340, the TX MCU 110 may determine whether the frequency set at step 330 provides optimal/desired wireless power delivery efficiency for the load power level of the power receiver (RX) system 120. If not, the process returns to step 330, where the TX MCU 110 will change/sweep the frequency and return to step 340. The loop/repetition between steps 330 and 340 may form a (inner) frequency-tuning loop.

In some embodiments, the TX MCU 110 may further determine whether the voltage set at step 320 provides optimal/desired wireless power delivery efficiency. If not, the process returns to step 320, where the TX MCU 110 will change/sweep the voltage and proceed to steps 330, 340, and voltage optimization determination. The loop/repetition for voltage tuning may form an outer voltage-tuning loop. In some embodiments, the frequency-tuning loop and the voltage-tuning loop may be switched.

The TX MCU 110 may change the amount of voltage and/or frequency using a set value (e.g., 10 mV, 10 Hz) or varying values. For example, when the change in power delivery efficiency of the WPT system is large, the TX MCU 110 may change the amount of voltage and/or frequency by a large step. When the rate of increase of the power delivery efficiency of the WPT system begins to decrease, the step change of the amount of voltage and/or frequency may be decreased. Use of such varying values for changes in the amount of voltage and/or frequency may allow the TX MCU 110 to fine tune the amounts of voltage and/or frequency used to deliver power with increased/optimal power delivery efficiency.

In some embodiments, the TX MCU 110 may be configured to save and reuse the set voltage and/or the set frequency for a power receiver system/load. For example, for a particular power receiver system and/or a particular load, the TX MCU 110 may have used the voltage-frequency tuning process to experimentally find the amounts of voltage and frequency that allows for increased/optimal power delivery efficiency. The amounts of the voltage and frequency may be stored by TX MCU 110 for reuse when the same power receiver system and/or the same load is again powered by the power transmitter (TX) system 100. Such storage of set voltage and frequency amounts may allow the power transmitter (TX) system 100 to reuse previously determined voltage and/or frequency amounts, or to set initial amounts of the voltage and/or frequency in the voltage/frequency tuning based on previously determined voltage and/or frequency amounts.

In some embodiments, the voltage and frequency tuning described herein may be used to achieve interoperability, rectifier voltage limitations, steady operation, and/or other requirements of a WPT system. For example, for interoperability of devices having different power requirements, the power transmitter (TX) system 100 may set its voltage to meet the power requirements and tune the frequency to increase/maximize wireless power delivery efficiency for the set voltage.

For rectifier voltage limitations, the power transmitter (TX) system 100 may obtain (e.g., based on communication with the power receiver (RX) system 120), a required rectifier voltage amount for a load connected to the power receiver (RX) system 120. While higher rectifier voltage may allow for higher load efficiency, higher rectifier voltage may require greater insulation demands of the receiver system, resulting in higher costs. The working frequency of the power transmitter (TX) system 100 may be selected such that the rectifier voltage does not exceed a preset/calculated maximum rectifier voltage.

For steady operation, the power transmitter (TX) system 100 may set its voltage and frequency so that small variations of operation parameters (e.g., frequency, voltage) will not result in unstable operation of the power transmitter (TX) system 100. For example, unstable operation of the power transmitter (TX) system 100 may be characterized by a monotonic portion and/or an unsmooth portion of an efficiency-frequency curve.

Figure 4A:
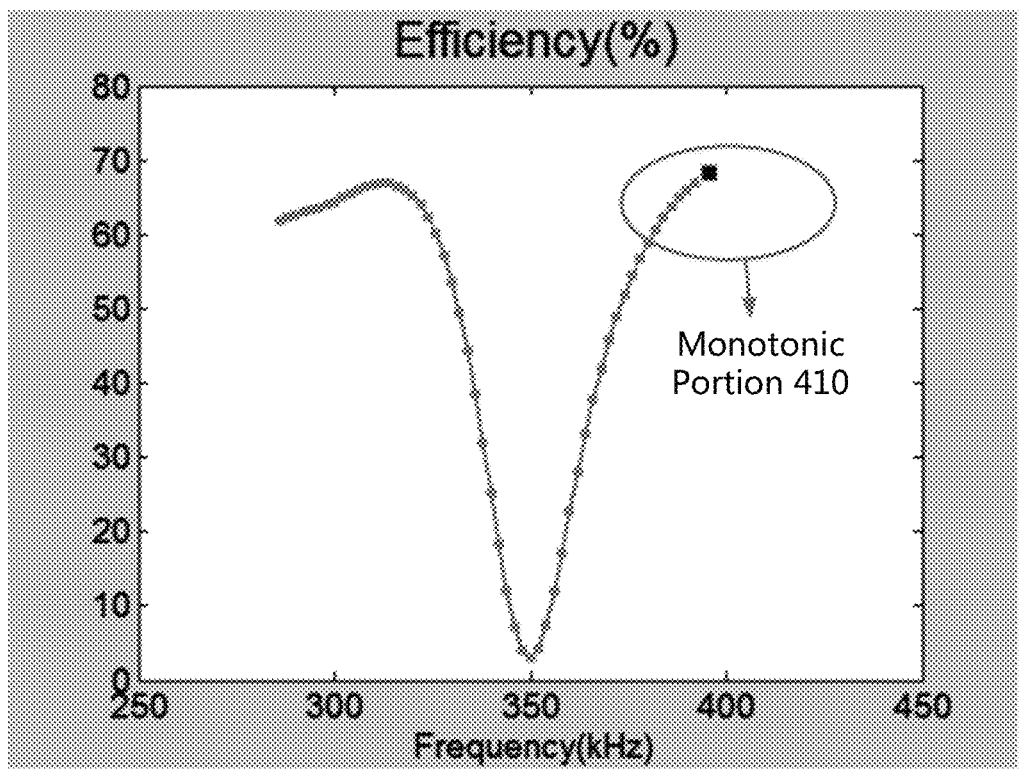
FIGS. 4A-4B illustrate example efficiency vs frequency plots showing unstable and stable operations, in accordance with various embodiments of the disclosure.

A monotonic portion of an efficiency-frequency curve may include a part of the efficiency-frequency curve where the efficiency only increases with increasing frequency. For example, FIG. 4A illustrates an example of a monotonic portion 410 of an efficiency-frequency curve. When the efficiency-frequency curve is monotonic, the power transmitter (TX) system 100 may be unstable when the power delivery efficiency reaches the maximum. As shown in FIG. 4A, the power delivery efficiency increases monotonically with the working frequency above 350 kHz. After some frequency point (e.g., 396 kHz), the output power capability of the power transmitter (TX) system 100 is limited, and the system may not work properly above this frequency point. Although 396 kHz may correspond to the maximum power delivery efficiency, this is an unstable working frequency because a small increase of the working frequency may lead to the disability of the system.

Figure 4B:
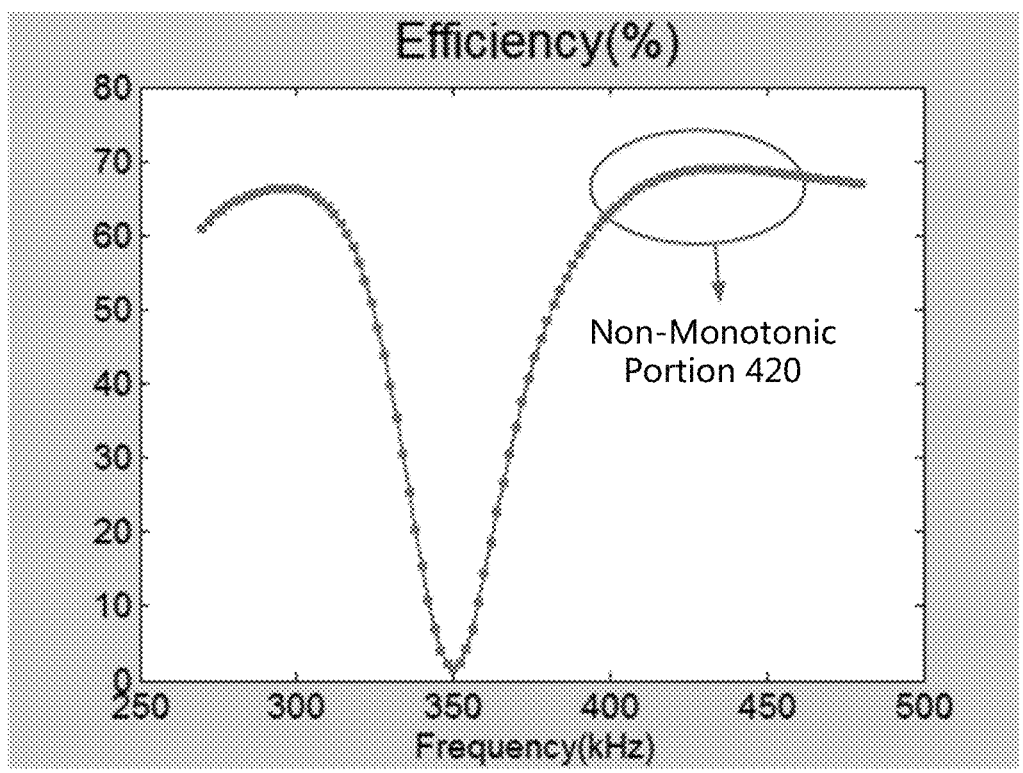

FIG. 4B illustrates an example of a non-monotonic portion 420 of an efficiency-frequency curve. The non-monotonic portion 420 of the efficiency-frequency curve indicates a stable operation of the power transmitter (TX) system 100. As shown in FIG. 4B, the power delivery efficiency may not monotonically increase with the working frequency above 350 kHz. Instead, there is a peak of the power delivery efficiency with the variation of the working frequency above 350 kHz.

This stability may require the sign of the derivative of the power delivery efficiency to the working frequency to change from positive to negative with the increasing working frequency, namely:

$$\frac{\partial \eta}{\partial f} = \lim_{\Delta f \to 0} \frac{\Delta \eta}{\Delta f} = \lim_{f_2 \to f_1} \frac{\eta(f_1) - \eta(f_2)}{f_1 - f_2} = \begin{cases} > 0, f_2 < f_1 < f_{opt} \\ < 0, f_{opt} < f_2 < f_1 \end{cases}$$

Where $f_{ops}$ is the (optimal) working frequency to achieve the maximum/desired power delivery efficiency. The criterion may be further simplified as:

$$\Delta\eta = \eta(f_1) - \eta(f_2) = \begin{cases} > 0, f_2 < f_1 < f_{opt} \\ < 0, f_{opt} < f_2 < f_1 \end{cases}$$

Figure 5A:
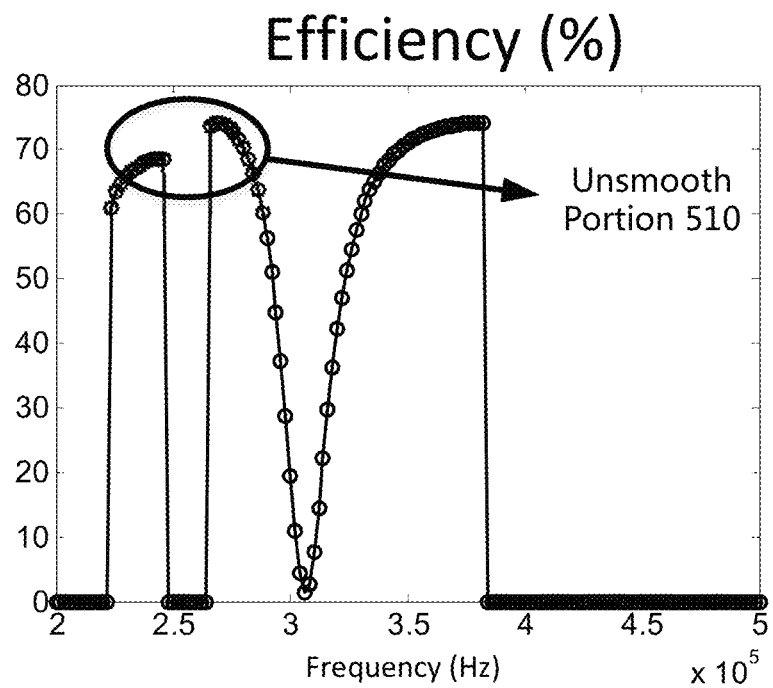
FIGS. 5A-5B illustrate example efficiency vs frequency plots showing unsmooth and smooth operations, in accordance with various embodiments of the disclosure.

An unsmooth portion of an efficiency-frequency curve may include a part of the efficiency-frequency curve where the power delivery fails or changes dramatically (e.g., sharp peaks/nadirs) for certain intervals of frequency. For example, FIG. 5A illustrates an example of an unsmooth portion 510 of an efficiency-frequency curve. When the efficiency-frequency curve is unsmooth, there may be frequencies where the power transmitter (TX) system 100 may be unable to output the rated amount of power. In other words, the power transmitter (TX) system 100 may fail at these frequencies. As shown in FIG. 5A, the power transmitter (TX) system 100 may be unable to output the rated amount of power around 250 kHz. Unsmooth portion 510 of the efficiency-frequency curve may indicate that a very small change in the frequency may result in a dramatic change in the power delivery.

Figure 5B:
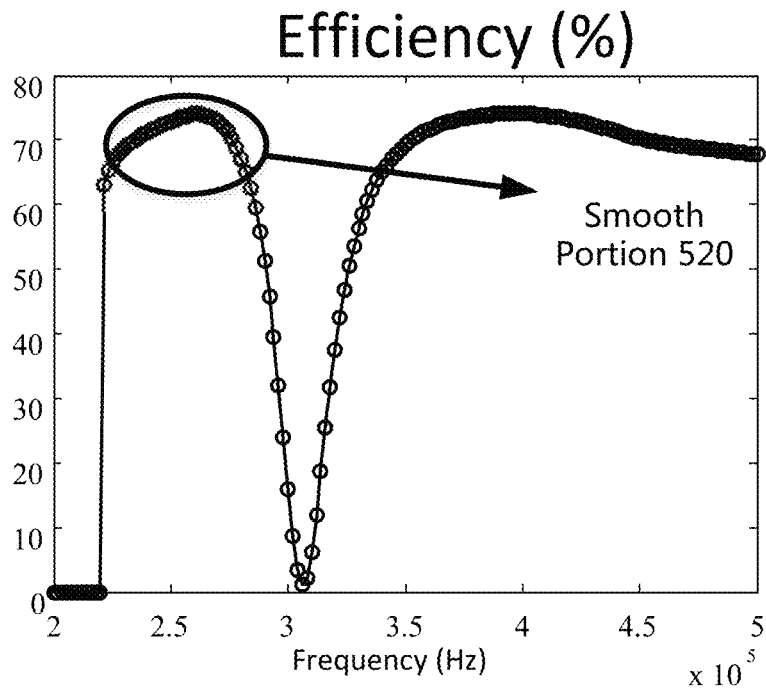

FIG. 5B illustrates an example of a smooth portion 520. The smooth portion 520 of the efficiency-frequency curve indicates a continuity of operation of the power transmitter (TX) system 100 across a frequency range. As shown in FIG. 5B, the power transmitter (TX) system 100 may continuously output the rated amount of power around 250 kHz and the power delivery efficiency changes smoothly with the variation of the working frequency around 250 kHz.

This stability may require that for a defined smoothness frequency band $f_{sm}$, the power delivery efficiency variation should not be larger than a preset/calculated maximum power delivery efficiency variation $\eta_{sm}$, namely:

$$|\eta(f) - \eta(f + f_{sm})| \leq \eta_{sm}$$

In summary, unstable operation of the power transmitter (TX) system 100 may be characterized by a monotonic portion and/or an unsmooth portion of an efficiency-voltage curve.

The specification has described methods, apparatus, and systems for wireless power transfer. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A wireless power transmitter system, comprising:
   a DC/DC converter configured to receive an input power;
   a controller coupled to the DC/DC converter and having a storage medium;
   a power amplifier coupled to the DC/DC converter, and coupled to the controller;
   a power transmitter coupled to the power amplifier, the power transmitter including a transmitter-side coil configured to wirelessly couple to a receiver-side coil of a power receiver system; and
   a sensing circuit coupled to the controller, the sensing circuit configured to determine output power information of the power receiver system,
   wherein the controller is configured to set a set voltage and a set frequency of the wireless power transmitter system corresponding to the power receiver system by conducting a voltage-frequency tuning process based on the output power information of the power receiver system to reach desired wireless power delivery efficiency of a wireless power transfer system that includes the wireless power transmitter system and the power receiver system, wherein the output power information includes an amount of power received by a load of the power receiver system, wherein the voltage-frequency tuning process includes:
      determining whether the load of the power receiver system is the same as a previously-powered load;
      setting, in response to the load of the power receiver system being the same as the previously-powered load, a previously-saved voltage and a previously-saved frequency corresponding to the previously-saved load as the set voltage and the set frequency, respectively; and
      conducting, in response to the load of the power receiver not being the same as the previously-powered load, operations comprising:
         sensing, by the power transmitter system and based on a coupling coefficient between the transmitter-side coil and the receiver-side coil, a position of the receiver-side coil;
         setting, based on the position of the receiver-side coil and a correspondence between a sensed position of the receiver-side coil and an amount of voltage, the set voltage;
         consecutively setting, by the controller, one or more frequencies of the wireless power transmitter system until the desired wireless power delivery efficiency is achieved, so as to obtain the set frequency; and storing, by the controller, the load of the power receiver system, and the set voltage and the set frequency corresponding to the load of the power receiver system, wherein the set voltage and the set frequency are reused when the load is again powered by the wireless power transmitter system.

2. The wireless power transmitter system of claim 1, wherein the output power information of the power receiver system includes amounts of a voltage and a current of the power receiver system.

3. The wireless power transmitter system of claim 1, wherein the output power information of the power receiver system is determined based on load modulation.

4. The wireless power transmitter system of claim 1, wherein the output power information of the power receiver system is determined based on communication with the power receiver system.

5. The wireless power transmitter system of claim 1, wherein the sensing circuit includes a load de-modulator, the load de-modulator configured to de-modulate signals modulated by a load modulator of the power receiver system, the signals including the output power information of the power receiver system.

6. The wireless power transmitter system of claim 1, wherein the sensing circuit includes a first radio, the first radio configured to receive the output power information of the power receiver system from a second radio of the power receiver system.

7. A method for wirelessly providing power to devices, the method comprising:
wirelessly coupling a transmitter-side coil of a power transmitter system to a receiver-side coil of a power receiver system, the transmitter-side coil included in a power transmitter coupled to a power amplifier, the power amplifier coupled to a DC/DC converter and a controller, the DC/DC converter configured to receive an input power and coupled to the controller;
determining output power information of the power receiver system;
setting a set voltage and a set frequency of the power transmitter system by conducting a voltage-frequency tuning process based on the output power information of the power receiver system to reach desired wireless power delivery efficiency of a power transfer system that includes the power transmitter system and the power receiver system, wherein the output power information includes an amount of power received by a load of the power receiver system, wherein the voltage-frequency tuning process includes:
determining whether the load of the power receiver system is the same as a previously-powered load;
setting, in response to the load of the power receiver system being the same as the previously-powered load, a previously-saved voltage and a previously-saved frequency corresponding to the previously-saved load as the set voltage and the set frequency, respectively; and
conducting, in response to the load of the power receiver not being the same as the previously-powered load, operations comprising:
sensing, by the power transmitter system and based on a coupling coefficient between the transmitter-side coil and the receiver-side coil, a position of the receiver-side coil;
setting, based on the position of the receiver-side coil and a correspondence between a sensed position of the receiver-side coil and an amount of voltage, the set voltage;
consecutively setting, by the controller, one or more frequencies of the power transmitter system until the desired wireless power delivery efficiency is achieved, so as to obtain the set frequency; and
storing, by the controller, the load of the power receiver system, and the set voltage and the set frequency corresponding to the load of the power receiver system, wherein the set voltage and the set frequency are reused when the load is again powered by the power transmitter system.

8. The method of claim 7, wherein the output power information of the power receiver system includes amounts of a voltage and a current of the power receiver system.

9. The method of claim 7, wherein the output power information of the power receiver system is determined based on load modulation.

10. The method of claim 7, wherein the output power information of the power receiver system is determined based on communication with the power receiver system.

* * * * *